United States Patent
Holzapfel

(10) Patent No.: US 10,601,272 B2
(45) Date of Patent: Mar. 24, 2020

(54) ROTOR FOR AN ELECTRICAL MACHINE, ELECTRICAL MACHINE, IN PARTICULAR AN ASYNCHRONOUS MACHINE FOR A MOTOR VEHICLE, AND MOTOR VEHICLE

(71) Applicant: AUDI AG, Ingolstadt (DE)

(72) Inventor: Christian Holzapfel, Lenting (DE)

(73) Assignee: AUDI AG, Ingolstadt (DE)

( * ) Notice: Subject to any disclaimer, the term of this patent is extended or adjusted under 35 U.S.C. 154(b) by 124 days.

(21) Appl. No.: 15/850,039

(22) Filed: Dec. 21, 2017

(65) Prior Publication Data
US 2018/0219443 A1    Aug. 2, 2018

(30) Foreign Application Priority Data

Jan. 30, 2017   (DE) .................. 10 2017 201 390

(51) Int. Cl.
*H02K 1/32* (2006.01)
*H02K 9/19* (2006.01)
*H02K 17/16* (2006.01)
*H02K 3/24* (2006.01)

(52) U.S. Cl.
CPC ............... *H02K 1/32* (2013.01); *H02K 3/24* (2013.01); *H02K 9/19* (2013.01); *H02K 17/16* (2013.01); *H02K 17/165* (2013.01); *B60Y 2306/05* (2013.01); *B60Y 2400/604* (2013.01)

(58) Field of Classification Search
CPC ............ H02K 1/22; H02K 1/24; H02K 19/38; H02K 9/19; H02K 19/16; H02K 9/193
See application file for complete search history.

(56) References Cited

U.S. PATENT DOCUMENTS

| 9,660,502 | B2 * | 5/2017 | Matsuki | ................... H02K 1/32 |
| 2007/0205686 | A1 * | 9/2007 | Ishida | ................... H02K 1/276 310/156.21 |
| 2010/0231067 | A1 * | 9/2010 | Ruffing | ................... H02K 1/32 310/61 |
| 2010/0237725 | A1 * | 9/2010 | Tatematsu | ............... B60L 50/66 310/61 |

(Continued)

FOREIGN PATENT DOCUMENTS

| CN | 103843232 A | 6/2014 |
| DE | 10 2004 049795 A1 | 11/2005 |

(Continued)

OTHER PUBLICATIONS

European Search Report dated Jun. 7, 2018 in corresponding EP 17204307.7 (10 pgs).

(Continued)

*Primary Examiner* — Alfonso Perez Borroto
*Assistant Examiner* — Leda T Pham
(74) *Attorney, Agent, or Firm* — Maier & Maier, PLLC

(57) ABSTRACT

A rotor for an electrical machine with one or a plurality of cooling ducts through which a cooling agent can flow. One end face of the rotor there is provided an annular space, bounded axially inwardly and radially outwardly and joined communicating with the cooling duct or ducts. A cover plate is provided, attached to the end face and bounding the annular space axially outwardly, having a central through-opening for introducing the cooling agent into the annular space.

11 Claims, 1 Drawing Sheet

(56) References Cited

U.S. PATENT DOCUMENTS

| | | | | |
|---|---|---|---|---|
| 2012/0220379 A1* | 8/2012 | Murakami | ............... | H02K 1/32 464/7 |
| 2015/0137632 A1* | 5/2015 | Takahashi | ................ | H02K 1/28 310/54 |
| 2016/0322874 A1* | 11/2016 | Yoshinori | ................ | H02K 1/32 |

FOREIGN PATENT DOCUMENTS

| | | |
|---|---|---|
| DE | 112008000535 T5 | 12/2009 |
| DE | 10 2015 224034 A1 | 11/2016 |
| EP | 2230751 A1 | 9/2010 |
| EP | 2667486 B1 | 11/2013 |
| JP | S48 57605 U | 7/1973 |
| JP | S49 7405 U | 1/1974 |
| JP | S51 110605 A | 9/1976 |
| JP | S51 160106 U | 12/1976 |
| JP | S60 183550 U | 12/1985 |
| JP | S63 7978 U | 1/1988 |
| JP | H09 93868 A | 4/1997 |
| JP | 2002345188 A | 11/2002 |
| JP | 2011 142788 A | 7/2011 |
| JP | 4715028 B2 | 7/2011 |
| JP | 2011-254574 A | 12/2011 |
| JP | 2012-235546 A | 11/2012 |
| JP | 2013-258889 A | 12/2013 |
| JP | 2016 049005 A | 4/2016 |
| TW | 201421870 A | 6/2014 |

OTHER PUBLICATIONS

German Search Report dated Sep. 5, 2017 of corresponding German application No. 102017201390.7; 6 pgs.

Office Action dated Jul. 9, 2019 in corresponding Chinese Application No. 201810083345.6; 18 pages including English-language translation.

* cited by examiner

ROTOR FOR AN ELECTRICAL MACHINE, ELECTRICAL MACHINE, IN PARTICULAR AN ASYNCHRONOUS MACHINE FOR A MOTOR VEHICLE, AND MOTOR VEHICLE

FIELD

The invention relates to a rotor for an electrical machine, comprising one or a plurality of cooling ducts through which a cooling agent can flow, wherein at one end face of the rotor there is provided an annular space, bounded axially inwardly and radially outwardly and joined communicating with the cooling duct or ducts.

BACKGROUND

With the increasing importance of electric mobility, issues of rotor cooling in electrical machines are increasingly taking on relevance. This is especially true for machines with high power density, such as are used in the automobile industry as driving motors. It has already been proposed, in order to take heat away from the rotor, to provide a hollow shaft into which a cooling agent is introduced by means of a lance. Due to centrifugal force during the movement of the rotor, the cooling agent flows along the hollow shaft. The drawback is that seals for taking in and/or discharging the cooling agent must withstand high mechanical stresses and therefore need to have a very sophisticated design and are prone to malfunction. Furthermore, considerable frictional losses occur at the seal.

In order to avoid the cooling of the rotor via its shaft, it has already been proposed to outfit the rotor with one or a plurality of cooling ducts, through which the cooling agent flows. For this, the cooling agent may be introduced into an annular space of the rotor, which is joined communicating with the cooling duct or one particular cooling duct. The cooling agent collecting in the annular space is conveyed axially through the cooling duct or ducts by centrifugal force during the movement of the rotor.

DE 11 2008 000 535 T5 discloses a cooling structure for rotary electrical machines in which magnetic uptake holes are provided in a rotor core such that they extend between axial end faces of the core, and cavities are provided each time in contact with permanent magnets so as to extend between the end faces of the core. Moreover, a feed duct for rotor cooling fluid is provided for feeding cooling fluid to a core end face, wherein the cooling fluid fed from the rotor cooling fluid feed duct is introduced into the cavities. A ring-shaped reservoir region is provided on a holder on the rotor side.

However, the integration of an annular space in a holder of the rotor requires a complex design of the holder, which significantly increases the manufacturing expense of such a rotor.

JP 2002 345 188 A discloses a rotor, in which permanent magnets are secured in magnet insert holes which are formed in a rotor core and which extend along a rotor shaft. Along the magnet insert holes are cooling ducts that carry a cooling fluid along the magnet insert holes and are formed such that their cross section protrudes toward the center of rotation.

TW 2014 21870 A discloses an oil-cooled motor, comprising a housing, a stator and a rotor, which has a rotor cooling duct. The volume between the stator and the rotor forms a cylindrical oil duct. By circulation of a cooling agent inside the motor, the heat generated by the motor is discharged.

SUMMARY

The invention is based on the object of indicating a less costly manufacturing option for the cooling of a rotor with axial cooling ducts.

For achieving this object, according to the invention, it is provided, in a rotor of the above-mentioned kind, that a cover plate is provided, attached to the end face and bounding the annular space axially outwardly, this cover plate having a central through-opening for introducing the cooling agent into the annular space.

The invention is based on the consideration that the outer boundary of the annular space is provided by a ring-shaped cover plate, which is secured as a separate component of the rotor on the end face of the rotor. As compared to the integration of the outer boundary of the annular space in a holder at the end face, the invention enables a design of the annular space such that the cover plate only needs to be attached to a rotor structure bounding the annular space radially outwardly and axially inwardly, at least in regions. Thus, one can avoid the costly fabrication expense of forming the axially outward boundaries of the annular space in a holder or other rotor component. Furthermore, the cover plate can be made from a different material than the rest of the rotor components, such as, for example, a lighter or more electromagnetically compatible material.

The annular space of the rotor according to the invention extends in particular entirely in the peripheral direction of the rotor. Thus, the annular space may also be considered or called an encircling radial groove. The cooling duct or one particular cooling duct is joined communicating with the annular space, in particular, the cooling duct or each cooling duct emerges into the annular space or the annular or radial groove. Consequently, if the cooling agent is introduced on the side of the cover plate through the through-opening into the annular space, it arrives in the rotating region of the rotor with sufficient rotational speed due to centrifugal force at the radially outer boundary of the annular space and is brought into the cooling duct or a particular cooling duct with the further inflow of the cooling agent. Thus the annular space produces a collecting channel for the cooling agent introduced into it.

The cover plate is usually flat, that is, its axial extension in the secured position is less than its diameter. Between a shaft passing through the rotor and the outer diameter of the through-opening there is appropriately provided a concentric free space for introducing the cooling agent. A rotor component on which the cover plate is secured may also be called a rotor body. Hence, the cover plate is a separate add-on component of the rotor relative to the rotor body. The rotor body and the cover plate may be of different material. The rotor body can bound the annular space axially inwardly and radially outwardly, at least in regions.

In the rotor according to the invention, the outer diameter of the through-opening is preferably further inward than the cooling duct or ducts. In other words, the inner diameter of the cover plate bounding the through-opening is positioned extending radially further inward than the radially innermost position of the end-face opening of the cooling duct or a particular cooling duct. This ensures that a sufficient volume is provided to accommodate the cooling agent through the annular space.

According to a preferred embodiment of the rotor according to the invention, the cover plate is secured to the rotor by force locking, especially by means of at least one screw and/or at least one bolt and/or by means of an adhesive, and/or by integral bonding, especially by means of welding. The screw and/or the bolt may accordingly penetrate into the rotor body. Moreover, it is advisable for the cover plate to be sealed in its fastening section by means of a sealing agent, especially a liquid sealant and/or an O-ring. Accordingly, the fastening section of the cover plate may be situated opposite a fastening section on the side of the rotor body, and the sealing means is arranged between the fastening sections. The sealing means may also be realized by the adhesive securing the cover plate.

Besides the axially outer boundary of the annular space by the cover plate, it is possible for the cover plate to have a recess formed concentrically to the through-opening on the side facing the annular space, whose outer diameter borders the annular space radially outwardly, at least in regions. In other words, the cover plate may have a step by whose peripheral surface the annular space is bounded radially outwardly, at least in regions. It is also conceivable for the annular space to be entirely bounded radially outwardly by the outer diameter of the recess or the peripheral surface of the step.

Especially in regard to a use of the rotor in an asynchronous machine, it is preferable to provide a squirrel cage. This cage may have several rotor bars arranged running from the end face to the opposite end face. Typically, the squirrel cage has a shorting ring at least at the end face where the cover plate is secured. The cooling ducts appropriately run further radially inward than the radial inner wall of the shorting ring. The squirrel cage is part of the rotor body.

More preferably, the annular space is bounded radially outwardly, at least in regions, by the squirrel cage, especially by its shorting ring. The squirrel cage can thus be used as well to bound the annular space. The cooling agent can thus advantageously collect at the bordering section of the squirrel cage, for example the inner diameter of the shorting ring, before it flows through the cooling duct or ducts. The annular space may also be bounded entirely on the axial outside by the squirrel cage, especially the shorting ring. Alternatively or additionally, the cover plate can be secured to the squirrel cage, especially to the shorting ring.

In the rotor according to the invention, a laminated core appropriately provided. The cooling duct or ducts usually pass through the laminated core. If a squirrel cage is provided, its rotor bars typically pass through the laminated core. The laminated core is likewise part of the rotor body. Preferably, the annular space is bounded on the axial inside by the laminated core. Alternatively or additionally, it may also be provided that the annular space is bounded by the laminated core on the radial outside, at least in regions. This is especially the case when no squirrel cage is provided.

In addition, the object mentioned at the outset is solved by an electrical machine, especially an asynchronous machine, for a motor vehicle, comprising a rotor according to the invention. All remarks about the rotor according to the invention may be applied analogously to the electrical machine according to the invention, so that the aforementioned advantages may also be achieved with it.

Preferably, there is provided in the machine according to the invention an intake arranged stationary with respect to the rotational movement of the rotor, by means of which the cooling agent can be brought into the annular space. The intake can be formed, for example, by a pipe or a flexible tubing. The intake may extend from outside the through-opening in the direction of the end face on which the cover plate is fastened. Furthermore, the intake may extend beyond the through-opening in the axial direction or be flush with the side of the through-opening facing the annular space. The intake is preferably arranged at a region of the cover plate facing the bottom side of the electrical machine, so that the cooling agent can flow by gravity into the annular space.

Appropriately, moreover, a housing with an outlet is provided, through which the cooling agent, after flowing through the rotor, can be discharged from the inside of the housing The outlet is preferably arranged opposite the cover plate and/or on the bottom side. The cooling agent emerging through the outlet can be discharged to an external cooler and cooled down again there.

More preferably, a stator is provided with at least one winding head, being arranged in such a way that during the rotating operation of the rotor, the cooling agent impinges on the winding head after flowing through the rotor. The cooling of the electrical machine may thus be extended at low cost from an internal rotor cooling to a supplemental cooling of the winding head or of a particular winding head. After impinging on the winding head, the cooling agent may emerge from the outlet.

It is furthermore advantageous in the machine according to the invention to provide at least one intake that introduces the cooling agent and/or at least one nozzle dispensing the cooling agent, by means of which at least one machine component to be cooled can be exposed to the cooling agent. The nozzle or one particular nozzle may emerge, for example, from the inlet and/or be directed to the machine component or one machine component. In this way, additional places of the electrical machine under thermal stress can be cooled.

Finally, the aforementioned object is achieved according to the invention by a motor vehicle comprising an electrical machine according to the invention. The electrical machine is preferably designed for the partial or total electrical drive of the motor vehicle. All remarks about the rotor according to the invention and the electrical machine according to the invention may be applied analogously to the motor vehicle according to the invention, so that the aforementioned advantages may also be achieved with it.

BRIEF DESCRIPTION OF THE FIGURES

Further advantages and details of the invention will emerge from the exemplary embodiments described below as well as on the basis of the drawing. These are schematic representations and they show.

DETAILED DESCRIPTION OF THE FIGURES

Figure 1:
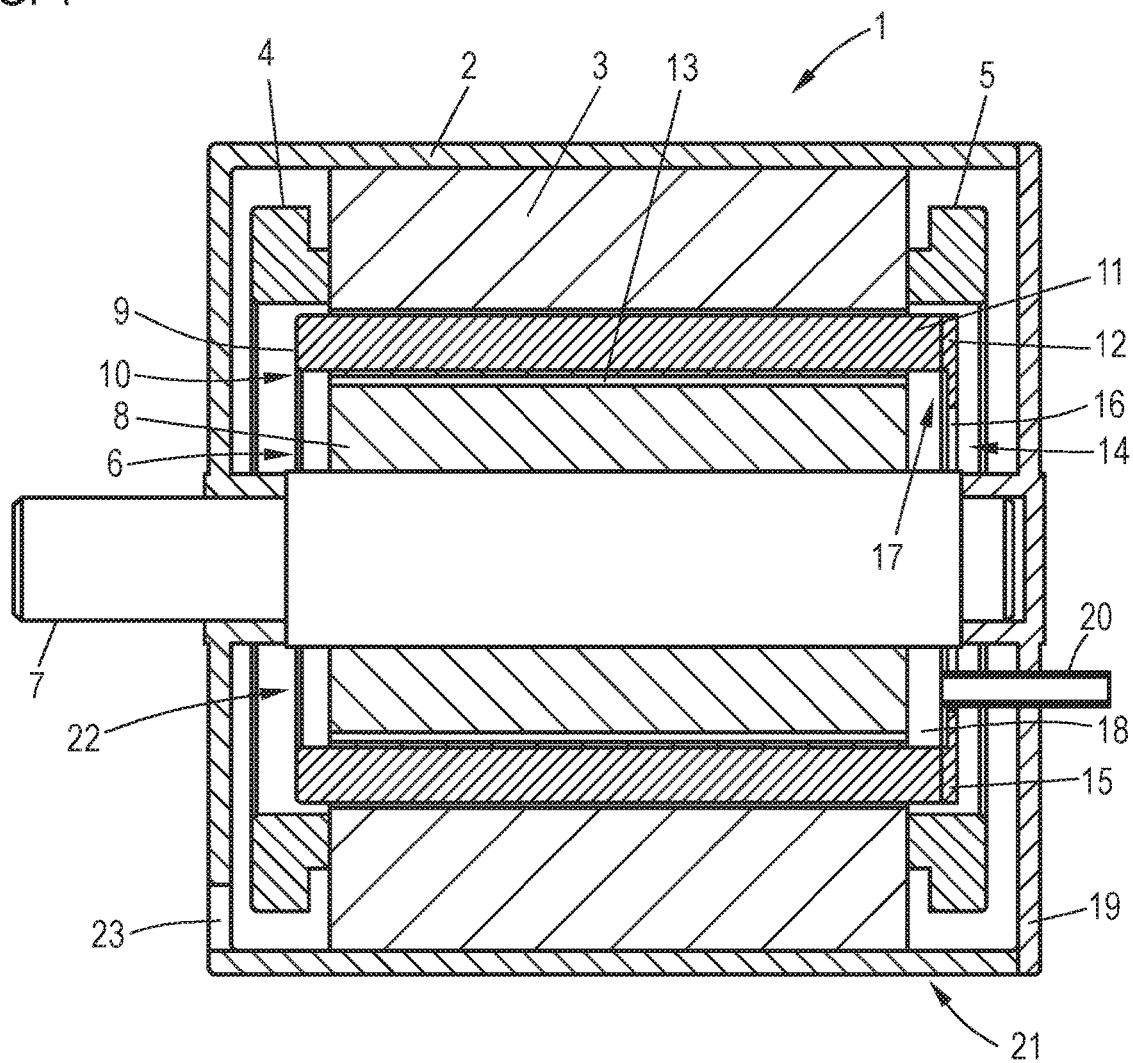
FIG. 1 a cross-sectional representation of an exemplary embodiment of an electrical machine according to the invention.

FIG. 1 shows a cross-sectional representation of an exemplary embodiment of an electrical machine 1 in the form of an asynchronous machine, comprising a housing 2, a stator 3 with several winding heads 4, 5 and a rotor 6, which is coupled to a shaft 7.

The rotor 6 has a laminated core 8 and a squirrel cage 9 comprising a rotor body 10. The squirrel cage 9 comprises a plurality of rotor bars 11, which pass substantially axially through the laminated core 8 and are joined at their respective ends by shorting rings 12. The laminated core 8, moreover, has a plurality of axial cooling ducts 13 passing through it, through which can flow a cooling agent, such as oil, for example, to discharge heat from the interior of the rotor 6.

Moreover, the rotor 6 has a cover plate 15 at one end face 14, which is secured to the rotor body 10. The fastening in the present case is realized at the shorting ring 12 by means of fastening means, which are not shown, such as, for example, screws and/or bolts, or by means of an adhesive or by welding. The cover plate 15 has a central through-opening 16 as well as a recess 17 formed on the side facing the rotor body 10, producing a step in the cover plate 15. In this way, an annular space 18 is formed, bounded axially inwardly by the laminated core 8, radially outwardly in regions by the inner peripheral wall of the shorting ring 12 and the outer peripheral wall of the recess 17, and axially outwardly by the cover plate 15, which space is joined communicating with the cooling ducts 13. Thus, the annular space 18 forms an inwardly open radial groove.

By means of an intake 20 passing through a cover 19 of the housing 2, for example, in the form of a pipe or flexible tubing, the cooling agent can be introduced into the electrical machine 1. This agent flows by gravity in the direction of a bottom side 21 of the electrical machine 1 into the annular space 18 and is moved in the rotating operation of the rotor 6 by centrifugal force against the radially outer boundary of the annular space 18. Thanks to the contact with the cooling agent, oppositely situated fastening regions of the rotor body 10 and the cover plate 15 are sealed off from each other by a sealing means, which is preferably a liquid sealant and/or an O-ring. The cooling agent collecting in the annular space 18 is directed with increasing inflow into and through the cooling ducts 13, producing a continuous flow for the cooling of the rotor 6.

After flowing through the cooling ducts 13, the cooling agent exits the cooling ducts at the opposite end face 22 and is hurled by the rotational movement of the rotor 6 in the direction of the winding heads 4, which are likewise cooled by the impinging cooling agent. This then flows from the winding heads 4 or immediately after leaving the cooling ducts 13 to the bottom side 21. Moreover, the housing 2 has an outlet 23, through which the cooling agent leaves the interior of the electrical machine 1. The emerging cooling agent is then taken to an external cooler in order to produce a cooling circuit and then is once more taken to the intake 20.

Furthermore, other intakes of cooling agent into the interior of the electrical machine 1 (not shown) are provided for the cooling of other regions under thermal stress. Nozzles directed at these regions can be provided at the inlets or at the intake 20, from which the cooling agent emerges and impinges on corresponding machine components under thermal stress. A discharging of the cooling agent so dispensed is likewise made possible by the outlet 23 on the bottom side.

According to another exemplary embodiment, the radially outer boundary of the annular space 18 is formed entirely by the rotor body 10, especially by the shorting ring 12. In an alternative exemplary embodiment in which the squirrel cage 9 can be eliminated entirely, the annular space is bounded on the radial outside entirely by the stepped cover plate 15. This is appropriate when the electrical machine 1 is a synchronous machine. In the context of another exemplary embodiment, the annular space 18 may be bounded on the radial outside entirely or in regions by the laminated core 8.

Figure 2:
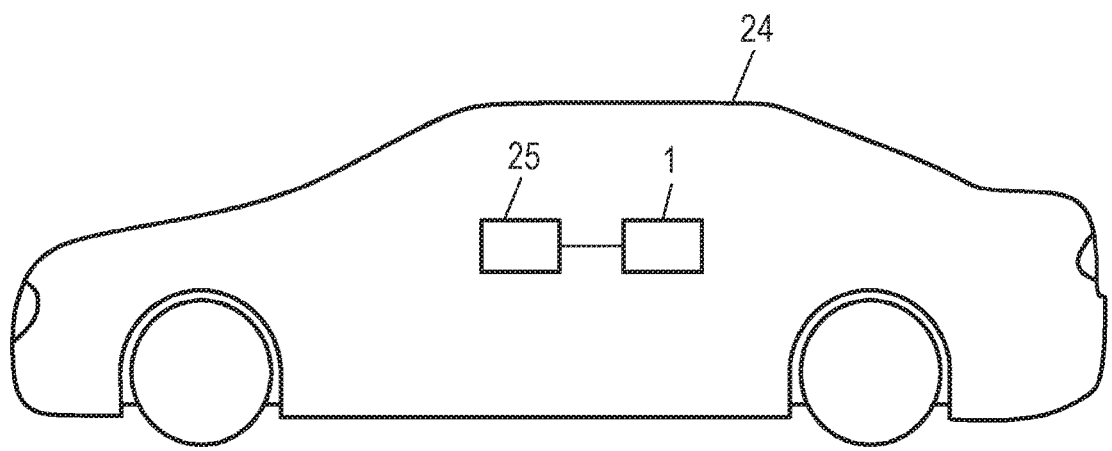
FIG. 2 a schematic diagram of an exemplary embodiment of a motor vehicle according to the invention.

FIG. 2 shows a schematic diagram of an exemplary embodiment of a motor vehicle 24 with an electrical machine 1 according to one of the preceding exemplary embodiments. The electrical machine 1 is connected to a drive train 25 of the motor vehicle 24 for the total or partial drive of the motor vehicle 1.

The invention claimed is:

1. A rotor for an electrical machine, comprising: one or a plurality of cooling ducts through which a cooling agent can flow, wherein at one end face of the rotor there is provided an annular space, bounded axially inwardly and radially outwardly and joined communicating with the cooling duct or ducts, wherein a cover plate is provided, attached to the end face and bounding the annular space axially outwardly, having a central through-opening for introducing the cooling agent into the annular space by way of an inlet passing through the cover plate and arranged stationary relative to the rotational movement of the rotor, wherein the cooling agent is configured to be collected by gravity in the annular space in a bottom side of the electrical machine and is moved during a rotating operation of the rotor by centrifugal force against a radially outer boundary of the annular space and subsequently into the cooling ducts.

2. The rotor as claimed in claim 1, wherein the outer diameter of the through-opening lies further inward than the cooling duct or ducts.

3. The rotor as claimed in claim 1, wherein the cover plate is secured to the rotor, by force locking, and/or by an adhesive, and/or by integral bonding.

4. The rotor as claimed in claim 1, wherein the cover plate is sealed off in a fastening section by a sealing agent.

5. The rotor as claimed in claim 1, wherein the cover plate on the side facing the annular space has a recess formed concentrically to the through-opening, whose outer diameter bounds the annular space radially outwardly, at least in regions.

6. The rotor as claimed in claim 1, wherein a squirrel cage is provided, by which the annular space is bounded radially outwardly, at least in regions, and/or on which the cover plate is secured.

7. The rotor as claimed in claim 1, wherein a laminated core is provided by which the annular space is bounded axially inwardly and/or radially outwardly at least in regions, and/or through which the cooling duct or ducts extend.

8. An electrical machine for a motor vehicle, comprising a rotor as claimed in claim 1.

9. The electrical machine as claimed in claim 8, wherein a housing with an outlet is provided, through which the cooling agent can be discharged from the inside of the housing after flowing through the rotor.

10. The electrical machine as claimed in claim 8, wherein a stator with at least one winding head is provided, being arranged in such a way that during the rotary operation of the rotor, the cooling agent impinges on the winding head after flowing through the rotor.

11. The electrical machine as claimed in claim 8, wherein at least one intake bringing in the cooling agent and/or at least one nozzle dispensing the cooling agent is or are provided, by which at least one machine component being cooled can be exposed to the cooling agent.

* * * * *